United States Patent
Holtz et al.

(10) Patent No.: US 7,296,486 B2
(45) Date of Patent: Nov. 20, 2007

(54) HYDRAULIC MOTOR DRIVE SENSOR ADAPTER

(75) Inventors: Todd G. Holtz, Houston, TX (US); Richard W. McCoy, Jr., Cypress, TX (US)

(73) Assignee: Oceaneering International, Inc., Houston, TX (US)

( * ) Notice: Subject to any disclaimer, the term of this patent is extended or adjusted under 35 U.S.C. 154(b) by 0 days.

(21) Appl. No.: 11/583,457

(22) Filed: Oct. 19, 2006

(65) Prior Publication Data

US 2007/0089532 A1 Apr. 26, 2007

Related U.S. Application Data

(63) Continuation-in-part of application No. 11/124,505, filed on May 6, 2005, now Pat. No. 7,231,837.

(51) Int. Cl.
*G01L 1/22* (2006.01)

(52) U.S. Cl. ............... 73/862.041; 73/862.042; 324/207.2; 324/207.22; 324/207.25

(58) Field of Classification Search ........... 73/862.041, 73/862.042; 324/207.2, 207.22, 207.25
See application file for complete search history.

(56) References Cited

U.S. PATENT DOCUMENTS

| | | | |
|---|---|---|---|
| 4,964,062 A | 10/1990 | Ubhayakar et al. | |
| 5,103,403 A | 4/1992 | Ch'Hayder et al. | |
| 5,279,309 A | 1/1994 | Taylor et al. | |
| 5,820,623 A | 10/1998 | Ng | |
| 5,838,882 A | 11/1998 | Gan et al. | |
| 6,234,672 B1 | 5/2001 | Tomasetti et al. | |
| 6,326,781 B1 | 12/2001 | Kunde et al. | |
| 6,429,016 B1 | 8/2002 | McNeil | |
| 6,448,763 B1 | 9/2002 | Spellman | |
| 6,492,807 B2 | 12/2002 | Spellman | |
| 6,493,606 B2 | 12/2002 | Saijo et al. | |
| 6,495,820 B1 | 12/2002 | Cooper | |
| 6,660,997 B2 | 12/2003 | Laberge et al. | |
| 6,693,423 B2 | 2/2004 | Weser | |
| 6,707,293 B2 | 3/2004 | Wan et al. | |
| 6,719,069 B2 | 4/2004 | Alft et al. | |
| 6,743,003 B2 | 6/2004 | Dong | |
| 2002/0082612 A1 | 6/2002 | Moll et al. | |
| 2004/0078182 A1 | 4/2004 | Nixon et al. | |

OTHER PUBLICATIONS

Lam, Kai Sing, et al. "Development of Joint Sensor and Signal Processing"; Thesis Description; one page.
Parker Products; Nichols Portland, "About Gerotors" http://www.parker.com/ead/cm2.asp?cmid=8954; 2 pages.
Vian Enterprises, Inc., "What is a Gerotor", http://www.vianenterprises.com/Gerotor.htm.

*Primary Examiner*—Edward Lefkowitz
*Assistant Examiner*—Freddie Kirkland, III
(74) *Attorney, Agent, or Firm*—Duane Morris LLP (57) ABSTRACT

Angular movement detectors may be disposed within or proximate to joints in one or more members of articulated arms and linked via one or more communications networks to a controller to provide angular movement data to the controller for use in controlling movement of the articulated arm. The communications networks may be redundant. In an embodiment, the angular movement detector comprises a hydraulic motor drive sensor adapter which uses an eccentrically rotating main shaft to rotate a drive shaft to which the main shaft is loosely connected to further rotate a socket housing about a constant central axis. A trigger mounted in the socket housing generates a detectable field.

15 Claims, 9 Drawing Sheets

HYDRAULIC MOTOR DRIVE SENSOR ADAPTER

RELATION TO OTHER APPLICATIONS

This is a continuation-in-part of U.S. patent application Ser. No. 11/124,505, filed on May 6, 2005 now U.S. Pat. No. 7,231,837.

FIELD OF INVENTION

The present invention relates generally to the field of controllers. More specifically, the present invention discloses a hydraulic motor drive sensor adapter. In contemplated embodiments, the hydraulic motor drive sensor adapter may be used as part of an angular movement detector and a system of deploying such angular movement detectors useful in controlling movement of an articulated arm. In claimed embodiments, the angular movement detector comprises a hydraulic motor drive sensor adapter which uses an eccentrically rotating main shaft to rotate a drive shaft to which the main shaft is loosely connected to further rotate a socket housing about a constant central axis. A trigger mounted in the socket housing generates a detectable field.

BACKGROUND OF THE INVENTION

In existing manipulator or robotic arm designs, the angular displacement of one or more joints is monitored with a resolver, potentiometer, or other rotation sensor. These require some sort of mechanical connection, typically a shaft, between the moveable portion of the joint and the sensor. Sensors are typically held stationary by the non-moveable portion of the joint. In a subsea environment, mechanical connection, e.g. a shaft, must be equipped with a mechanical connection seal to prevent seawater intrusion into the sensor. This mechanical connection seal is prone to failure, thus resulting in the subsequent failure of the sensor.

Further, existing solutions require discrete wiring for each sensor installed. Arms with large numbers of joint sensors require considerable wiring that can be difficult to install and maintain.

Further, existing sensor types often require that some sort of host controller read analog values that are produced by the sensor, e.g. a resolver or potentiometer. This requires that the controller provide processing power to read, filter, and scale the readings of each of the sensors which have had to transmit analog signals over long, noise-prone conductors.

BRIEF DESCRIPTION OF EMBODIMENTS OF THE INVENTIONS

Figure 1:
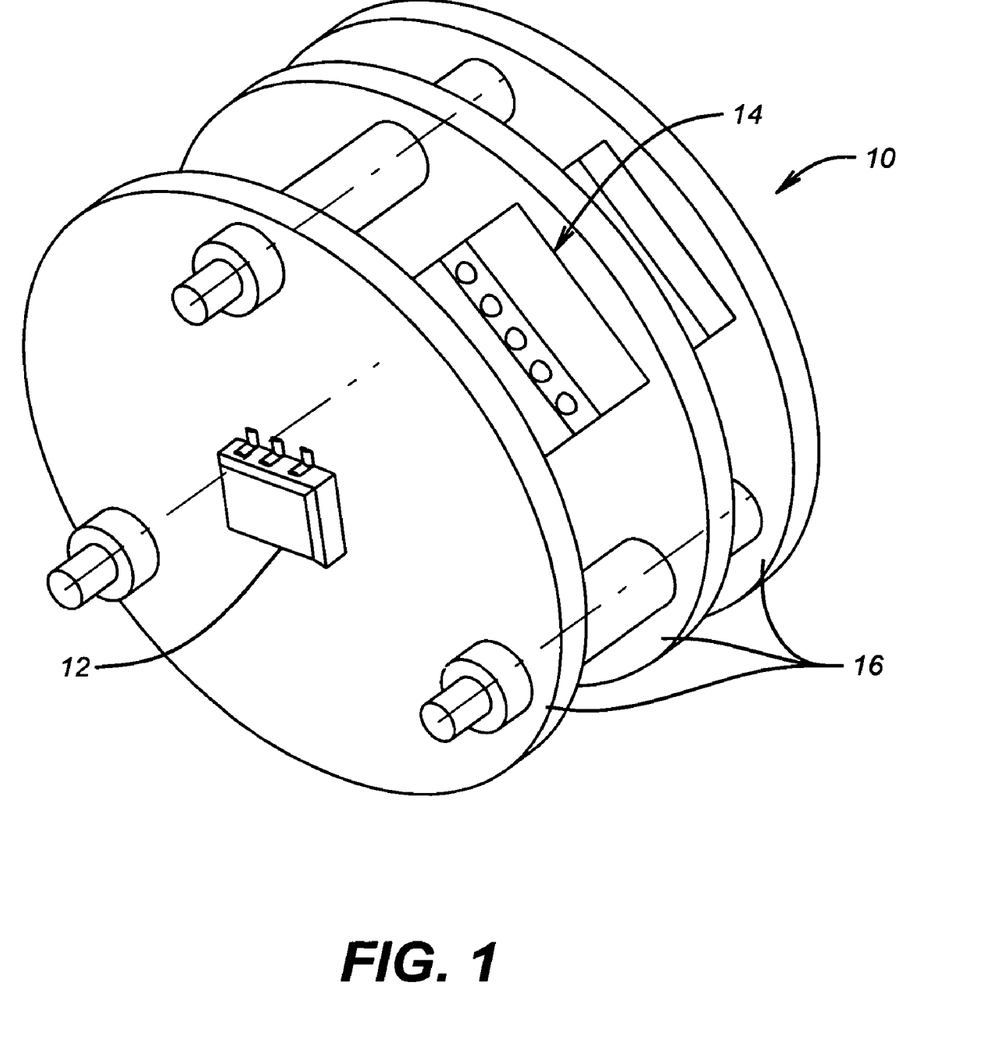
FIG. 1 is a view in partial perspective of an embodiment illustrating an angular movement detector.
Figure 2:
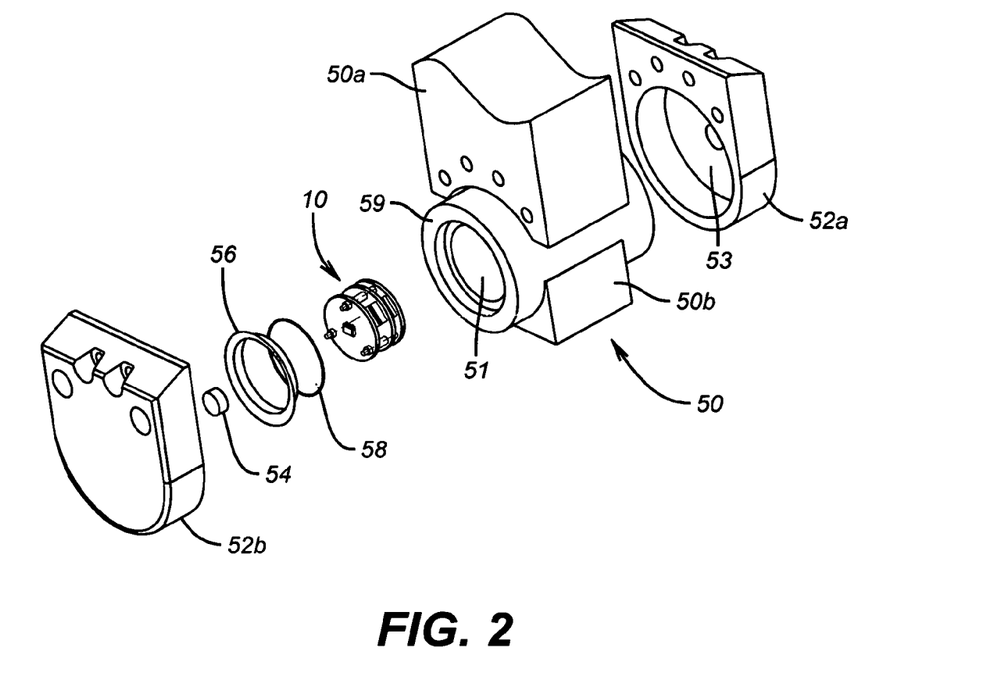
FIG. 2 is an exploded view in partial perspective of an embodiment illustrating an angular movement detector and a joint of an articulated arm.
Figure 3:
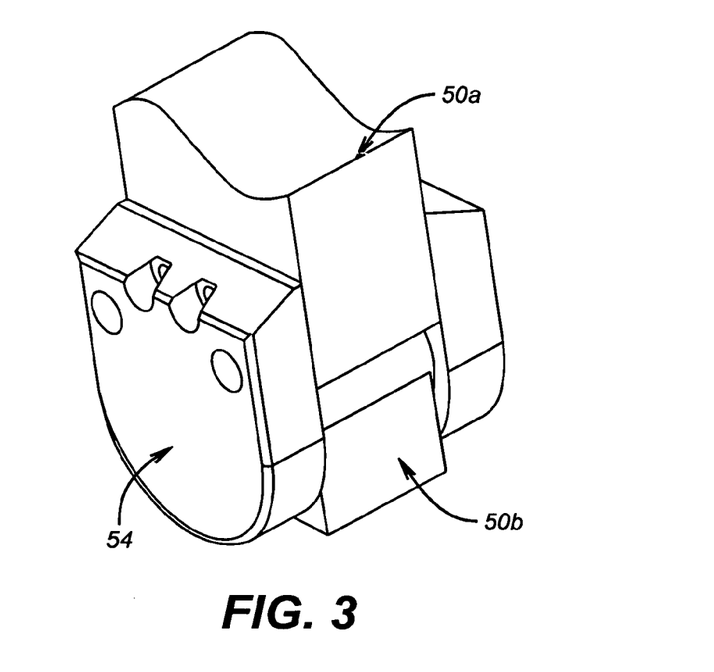
FIG. 3 is a view in partial perspective of an embodiment illustrating the joint of an articulated arm.

In exemplary embodiments described herein below, the inventions comprise one or more angular movement detectors 10 (FIG. 1) capable of resolution of angular movement of two members rotatably joined and moveable within at least two planes. Position sensing system 1 (FIG. 4) comprises two or more such angular movement detectors 10 and communications network 100 with which sensors 12 are operatively in communication. Redundant system 2 (FIG. 5) provides additional features to system 1:

Referring now to FIGS. 1-3, in typical embodiments, each angular movement detector 10 is adapted to be housed within) but isolated from manipulator joint 50 (FIG. 2). Angular movement detector 10 is mechanically decoupled from the rotation of joint 50 with respect to trigger 54, e.g. field generator 54 (FIG. 2), to which sensor 12, housed either within or proximate angular movement detector 10, is sensitive.

In an embodiment, angular movement detector 10 is useful for an articulated arm control network, e.g. network 200 (FIG. 4) or network 300 (FIG. 5), and comprises sensor 12 adapted to be disposed within or proximate joint 50 (FIG. 2) of articulated member 210 (FIG. 4). and trigger 54 (FIG. 2) disposed proximate to sensor 12. Sensor 12 can sense changes in or caused by trigger 54. Electronics 14 may be present and in communication with sensor 12, e.g. to further condition or otherwise adapt signals from sensor 12 and to interface with articulated arm control network 200, 300. For example, electronics 14 may comprise a suitable analog-to-digital converter.

Sensor 12 and/or trigger 54 as well as electronics 14 may be mounted on one or more carrier plates 16.

In a preferred embodiment, sensor 12 is sensitive or other otherwise adapted to detect an orientation of an electromagnetic field, e.g. by sensitive to orientation of such a magnetic field, and may comprise one or more anistropic magneto-restrictive sensors, Hall-effect sensors such as a two-axis Hall-effect sensor, or the like, or a combination thereof.

Trigger 54 may be electromagnetic field generator 54 (FIG. 2) which triggers sensor 12. Trigger 54 may comprise a magnet or other source of a magnetic field where the generated magnetic field is strong enough to be detected by sensor 12.

Positioning of triggers 54 and sensors 12 may be interchanged, i.e. triggers 54 may be adapted to be housed in angular movement detector 10 and sensors 12 disposed proximate sensor triggers 54 elsewhere within or proximate to manipulator joint 50 or vice-a-versa.

Sensor 12 may be further adapted to communicate with a communications network, e.g. communications network 100 or 300a, b.

In an embodiment, one or more titanium windows 56 (FIG. 2) may be present in which sensor electronics 14 are disposed.

Referring now to FIG. 2, joint 50 may further comprise annulus 51 adapted to receive a fluid such as a hydraulic fluid. Angular movement detector 10 may be disposed within annulus 51 and/or in fluid disposed in annulus 51.

As illustrated in FIG. 2 and FIG. 3, joint 50 comprises rotating arm member 50a arranged in a rotating configuration about stationary arm member 50b. It is understood that, as used herein, stationary means relative or with respect to rotating arm member 50a.

In a typical embodiment, endcaps 52a, 52b are adapted to movingly seal against joint housing 59. Accordingly, one or more seals 58, e.g. O-rings, may be present to help seal joint 50 during rotation, as will be familiar to those of ordinary skill in the art. Endcaps 52a, 52b may be selectively removable, e.g. hinged, to allow access to angular movement detector 10.

Figure 4:
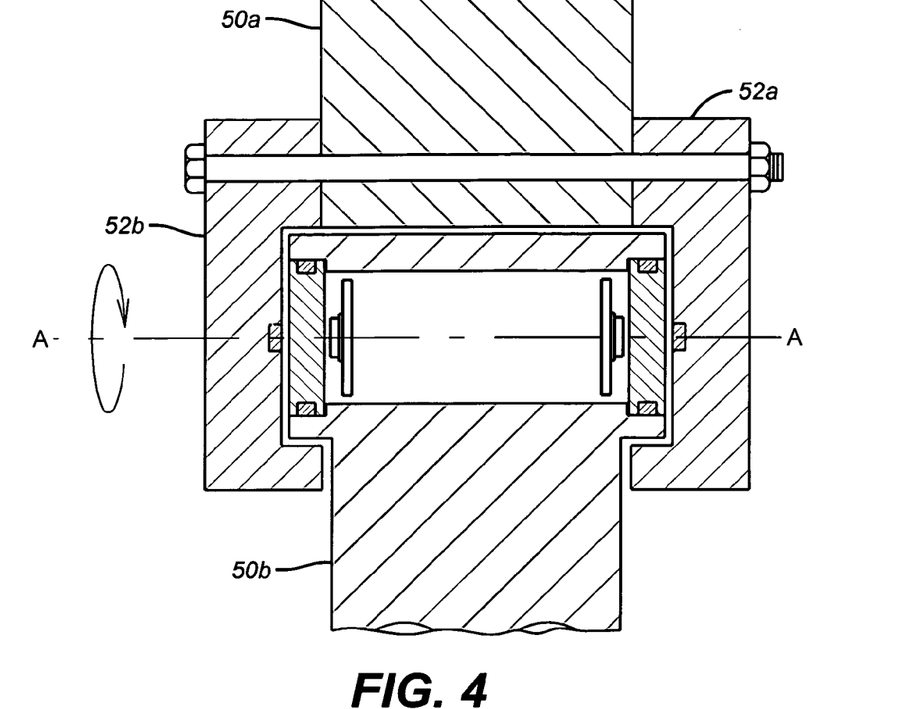
FIG. 4 is a view in partial cutaway perspective of an embodiment illustrating the joint of an articulated arm.

Referring now to FIG. 4, in a further contemplated embodiment, trigger 54 comprises a magnetic field generator, e.g. a permanent magnet, which is mounted about or to rotating arm member 50a, e.g. embedded within rotating arm member 50a, such that trigger 54 rotates with rotating arm member 50a. Angular movement detector 10, comprising sensor 12 (FIG. 2), is mounted about or to stationary arm member 50b, e.g. embedded within stationary arm member 50b. A rotating magnetic field created by trigger 54 is detected by sensor 12, e.g. as the magnet rotates with respect to sensor 12, a passes through one or more titanium windows 56 (FIG. 2).

As further illustrated in FIG. 4, moveable portions of an arm, rotating arm 50a which are illustrated with the same hatch marks, rotate about the axis A-A. Trigger 54 (FIG. 2) is disposed in or about rotating arm member 50a. Stationary arm member 50b, hatched using a different pattern and at a different angle, contains one or more angular movement detectors 10 comprising sensor 12 and titanium window 56 (FIG. 2). In certain embodiments, titanium window 56 is not moveable once installed.

Figure 5:
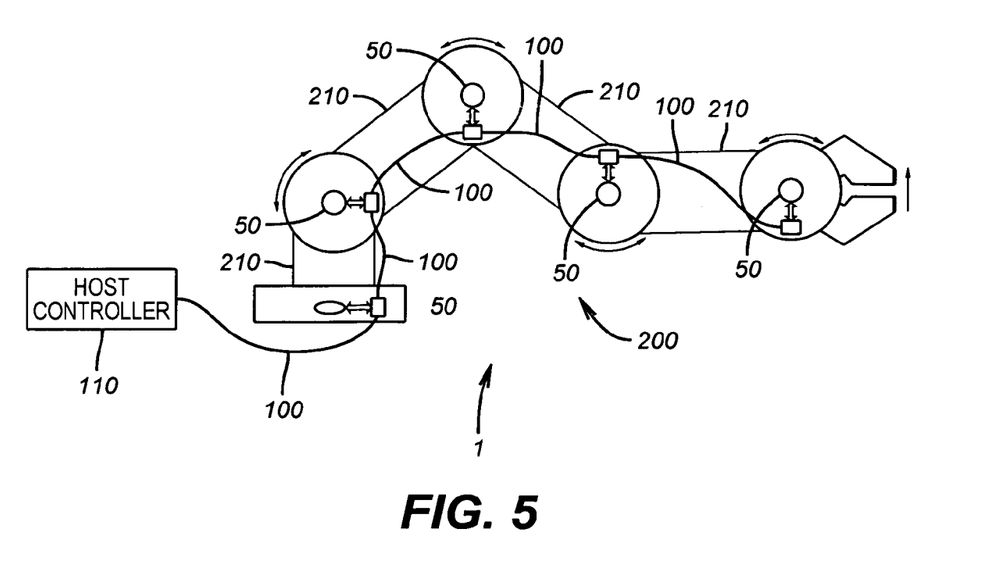
FIG. 5 is a schematic view of a non-redundant embodiment of a control network using angular movement detectors.

Referring now to FIG. 5, in an embodiment, position sensing system 1 is adapted for aiding in determining angular position of members 50 of articulated arm 200. Articulated arm 200 and its incorporated angular movement detectors 10 may be adapted for use subsea.

In an embodiment, position sensing system 1 is disposed about and/or within articulated arm 200 and comprises one or more angular movement detectors 10 disposed in joints 50 of articulated arm 200, communications network 100, and triggers 54 disposed external to angular movement detector 10. In a preferred embodiment, one trigger 54 is present for each angular movement detector 10.

Angular movement detector 10 is as described above and is operatively in communication with communications network 100. Angular movement detectors 10 are linked to each other and controller 110 via communications network 100, which, in the preferred embodiment, is a Controller Area Network ("CAN"), as that term will be familiar to those of ordinary skill in the art. Other data networks may be used, e.g. Bluetooth, WiFi, wired, fiber optic, or the like, or combinations thereof.

Position sensing system 1 uses communications network 100 to obtain and otherwise transmit data from angular movement detectors 10 arranged along joints 50 of articulated arm 200 to sense position of members 210 of articulated arm 200 with respect to adjacent members 210 of articulated arm 200.

In an embodiment, at least one sensor 12 is disposed within each angular movement detector 10 and adapted to detect an orientation of a magnetic field and produce a digital signal representation of the sensed magnetic field. The digital signal may be produced by angular movement detector 10 or by electronics 14 associated with angular movement detector 10. Trigger 54, e.g. a magnetic field generator, is disposed external to angular movement detector 10, proximate sensor 12 and in a fixed position relative to joint 50. Communications network 100, e.g. a digital data communications network, is operatively in communication with each angular movement detector 10 and host controller 110 where host controller 110 is adapted to receive and process the digital signal representation from sensor 12 to aid in controlling the movement of articulated arm 200.

In a further embodiment, a unique one of a plurality of articulated members 50 may be disposed within a predetermined set of joints 50 of articulated members 210, e.g. within each such joint 50.

Figure 6:
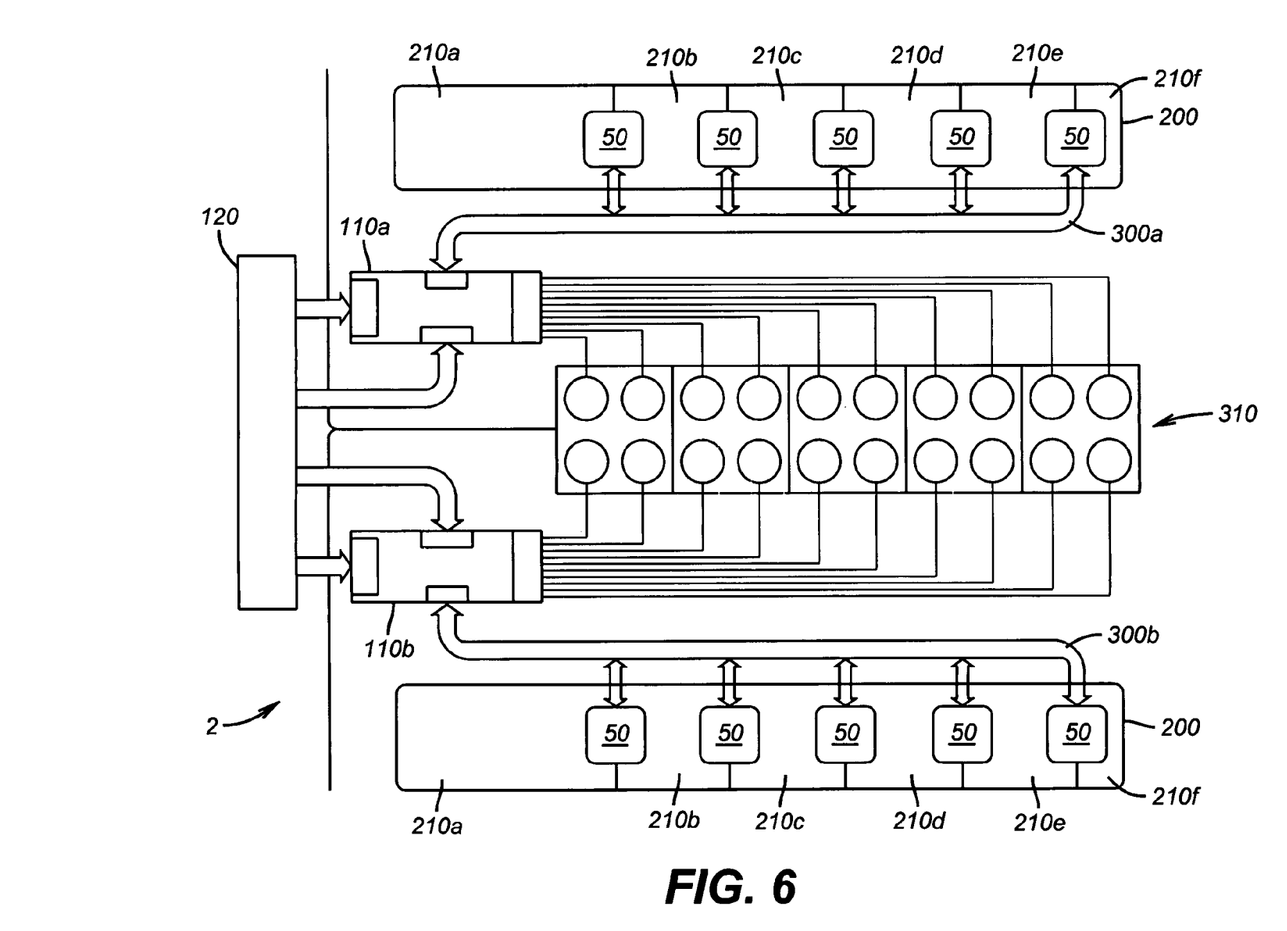
FIG. 6 is a schematic view of a redundant embodiment a control network using angular movement detectors.

Referring now to FIG. 6, in a further embodiment, articulated arm 200 comprises one or more angular movement detectors 10 disposed in predetermined joints 50 of articulated arm 200, e.g. one angular movement detector 10 (FIG. 1) in each joint 50. Sensors 12 (FIG. 1) within angular movement detectors 10 are linked to each other and controllers 110a, 110b via a plurality of communications networks 300, e.g. 300a and 300b, which, in the preferred embodiment, are CANs arranged in a redundant configuration. As illustrated in FIG. 6, each arm 200 is the same arm 200 and shown in mirror configuration.

For example, each communications network 300a, 300b is redundantly in communication with the same set of angular movement detectors 10 (FIG. 1) disposed within joint 50 of articulated arm 200 which are adapted to sense a position of a first segment 210 of articulated arm 200, e.g. 210a, with respect to an adjacent segment 210 of articulated arm 200, e.g. 210b. In an alternative embodiment, each communications network 300 can be in communication with a parallel set of angular movement detectors 10.

A plurality of controllers 110a, 110b are adapted to control movement of articulated arm 200 and may be configured in any number of equivalent redundant configurations, e.g. master-slave. A corresponding plurality of data communications networks 300a, 300b are operatively interconnected with angular movement detectors 10 such that a predetermined one of data communications networks 300a, 300b is linked to a corresponding predetermined one of the two controllers 110a, 110b.

Figure 8:
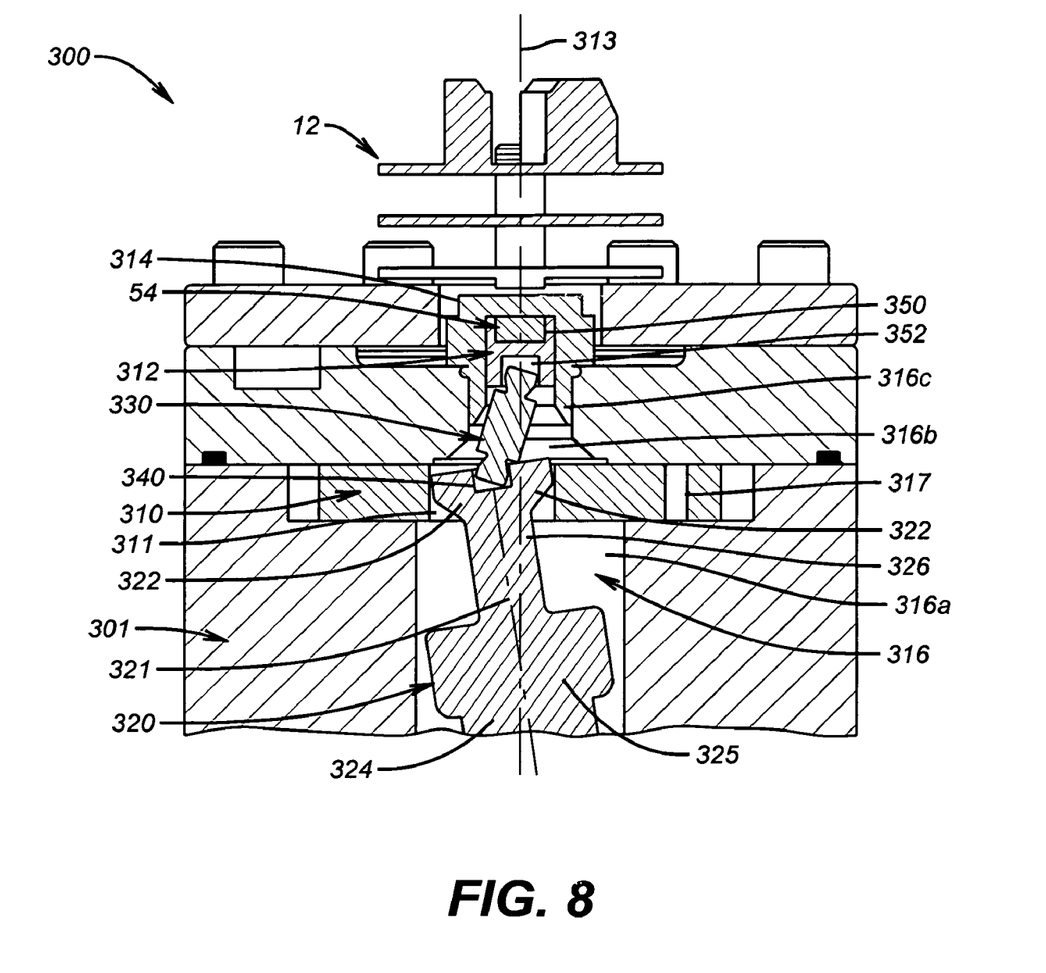
FIG. 8 is a cutaway view in partial perspective of an exemplary hydraulic motor drive sensor adapter.

Referring now to FIG. 8, in certain embodiments angular movement detector 10 (FIG. 1) further comprises hydraulic motor drive sensor adapter 300.

Hydraulic motor drive sensor adapter 300 comprises motor body 301 which further comprises central channel 316 disposed at least partially through an internal portion of motor body 301. Central channel 316 defines central longitudinal axis 313. A suitable motor body is manufactured by Parker Hydraulic Pump & Motor Division, 2745 Snapps Ferry Road, Greenville, Tenn.

Disk valve 310 is rotatably mounted within a pre-determined portion of motor body 301 and is in fluid communication with central region 316. Disk valve further comprises central port 311 substantially aligned with central channel 316 and one or more outer ports 317 disposed about an outer circumference of disk valve 310.

Main shaft 320 is rotatably mounted at least partially within central channel 316 and further comprises central axis 321 which is not concentric with central longitudinal axis 313; upper end 322 loosely disposed at least partially within central port 311 such that movement of upper end 322 within central port 311 is limited in a predetermined plane; drive shaft receptacle 340 positioned at upper end 322; and lower end 324. In preferred embodiments, the inner diameter of central port 311 is smaller than the inner diameter of central channel 316. Further, in currently preferred embodiments, the center of central port 311 is not concentrically aligned about central longitudinal axis 313.

Socket housing 312 is rotatably positioned about a constant axis within motor body 301 and further comprises top surface 150 and internal chamber 352. In preferred embodiments, this constant axis is aligned with central longitudinal axis 313 but does not have be so aligned.

In preferred embodiments, socket housing 312 is made of the same material as main shaft 320. Preferably, socket housing 312 should be made of a softer bearing material to allow it to ride inside hollow plug 314. Hollow plug 314 is preferably made of stainless steel.

One or more small slots (not shown in the figures) may be added along the length of socket housing 312 to aid in removing main shaft 320. Once oil penetrates the gap between socket housing 312 and hollow plug 314, suction will prevent easy removal of main shaft 320. A slot will allows air to intrude as hollow plug 314 is pulled out. A slot also aids in lubrication as main shaft 320 turns.

Figure 9:
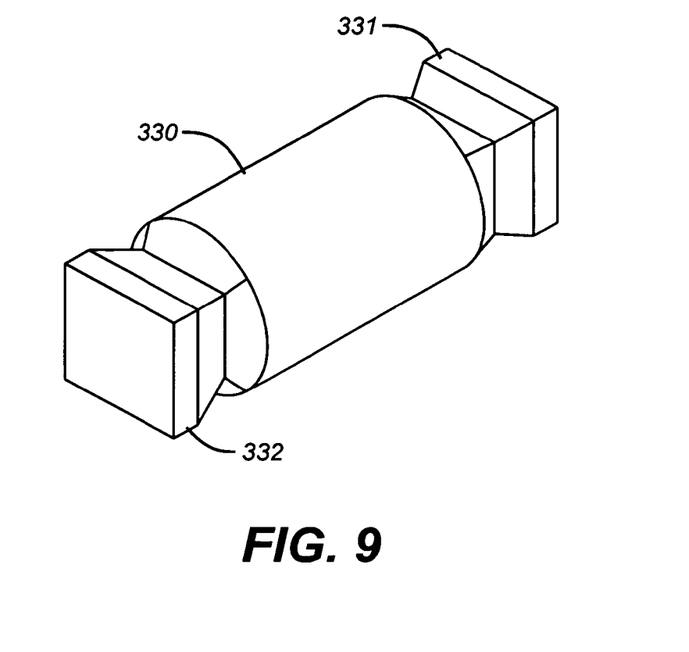
FIG. 9 is a view in partial perspective of an exemplary drive shaft.
Figure 10:
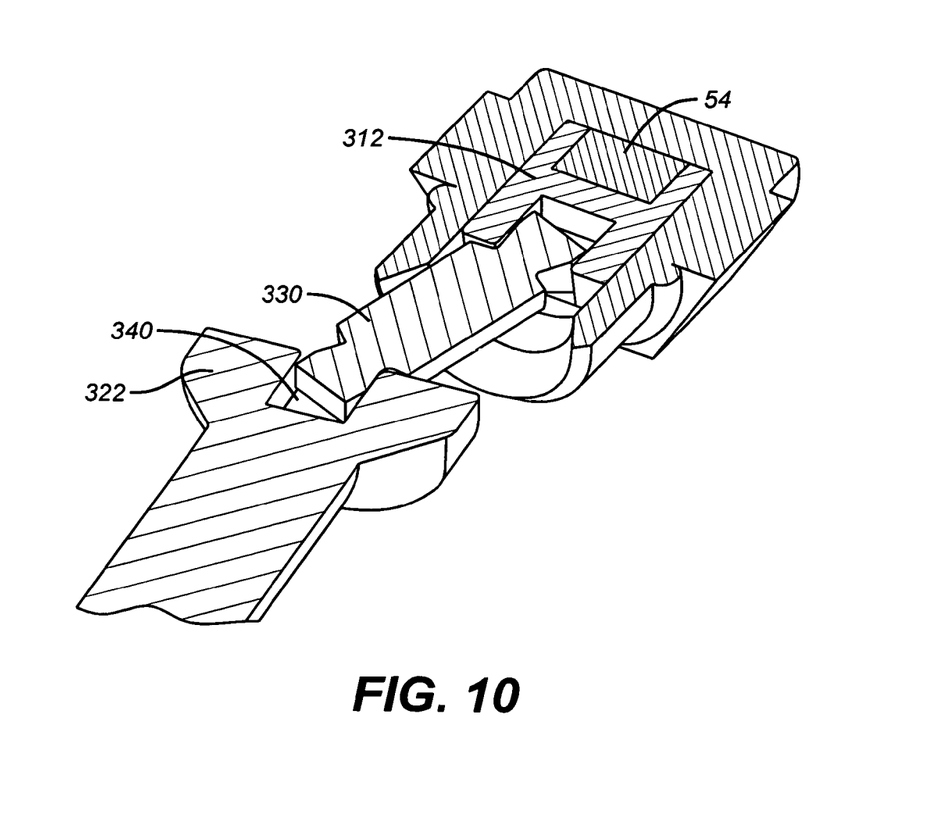
FIG. 10 is a cutaway view in partial perspective of an exemplary drive shaft assembly.

Referring additionally to FIGS. 9 and 10, drive shaft 330 is disposed within an upper portion of central channel 316 and comprises lower region 331 loosely mounted in shaft receptacle 340 such that movement of lower region 331 of drive shaft 330 within shaft receptacle 340 is limited in a predetermined plane. Drive shaft 330 further comprises upper region 332 which is disposed opposite lower region 331 and is loosely mounted within internal chamber 352 such that movement of upper region 332 of drive shaft 330 within internal chamber 352 is limited a predetermined plane. In some preferred embodiments, these planes of limited movement are parallel. In other preferred embodiments they are not parallel.

Drive shaft 330 may be a circular drive shaft, an elliptical drive shaft, an obround drive shaft, a splined drive shaft, or a polygonal drive shaft. Preferably, polygonal drive shafts 330 are used and comprise at least three sides with four sides being a common configuration.

Trigger 54, preferably a magnet, is mounted on top surface 150 of socket housing 312 above upper region 332 of the drive shaft 330. In the preferred embodiment, magnet 54 may be removably fixed into place to allow replacement of magnet 54.

In certain contemplated embodiments, a pre-existing geroter may be modified in accordance to the teachings herein. An exemplary geroter motor is manufactured by Parker Hydraulics with part number TE00800FM100AAA.

Sensor 12 is disposed within a magnetic field generated by magnet 54 and the distance separating sensor 12 and magnet 54 remains constant in a predetermined plane. As noted above, sensor 12 may be an anisotropic magnetorestrictive sensor or a Hall-effect sensor or the like. In preferred embodiments, sensor 12 comprises a two-axis Hall-effect sensor adapted to sense rotation of magnet 54.

Figure 7:
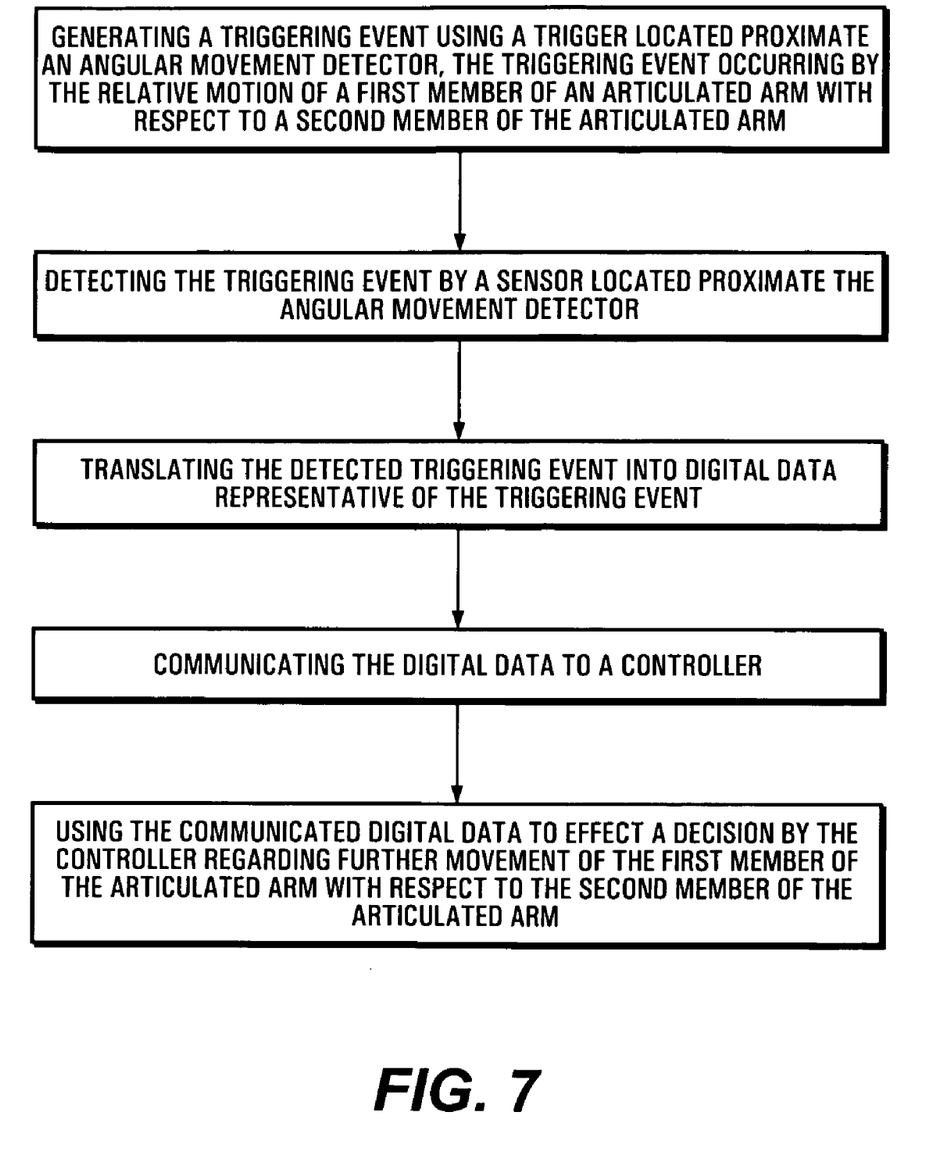
FIG. 7 is a flowchart of an exemplary method of using a control network using angular movement detectors.

In the operation of an exemplary embodiment, referring now to FIG. 7, sensors 12 mounted within or proximate angular movement detector 10 react to trigger 54, e.g. an electromagnetic field flux generated by electromagnetic field generator 54, to produce a signal representative of the triggering event, e.g. a change in the electromagnetic field flux. The signal may be translated into a digital representation and communicated via communications network 200 to controller 110 which may then interpret the digital representation to resolve angular movement of joint 50 in or about which angular movement detector 10 is disposed.

Figure 11:
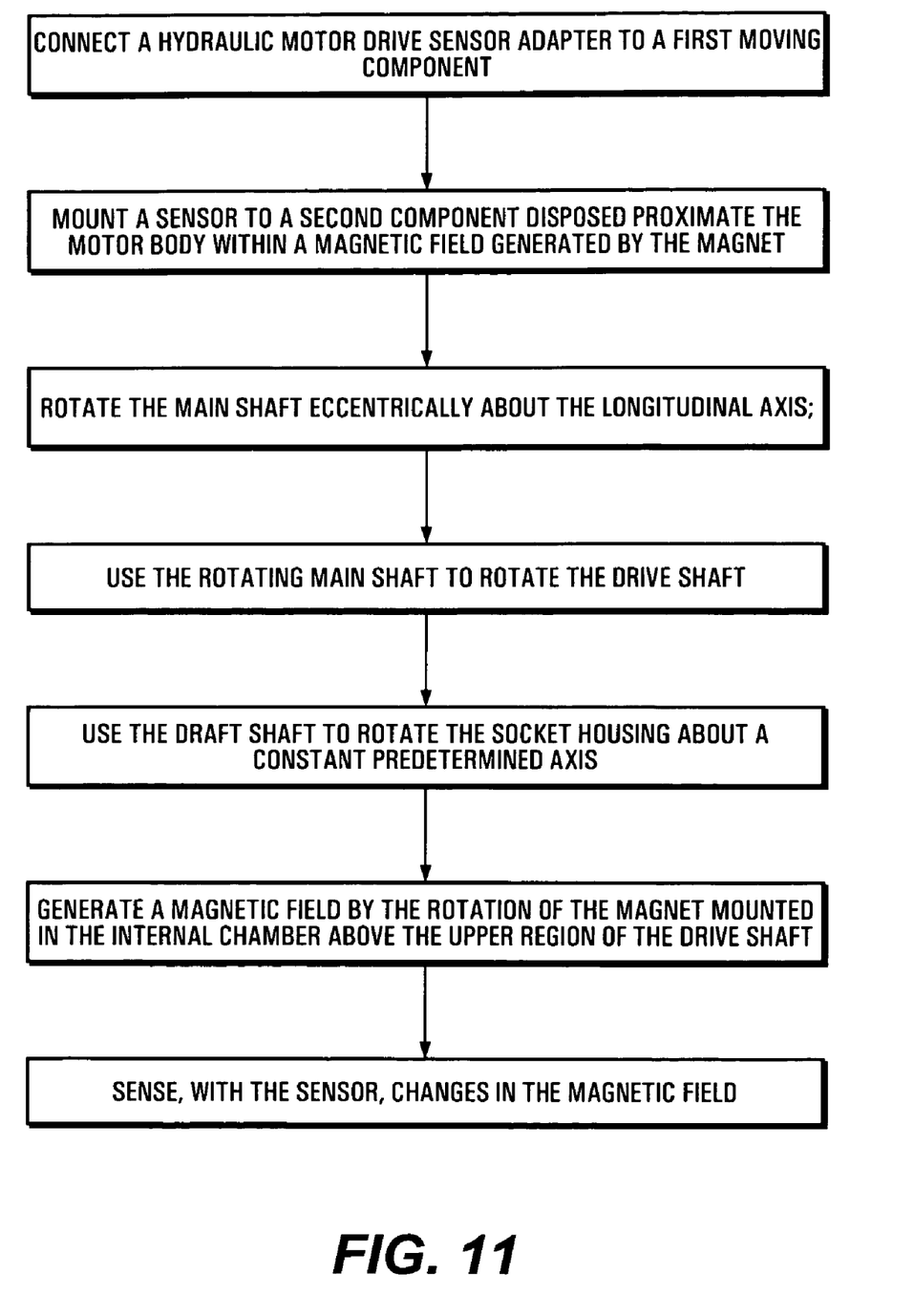
FIG. 11 is a flowchart of an exemplary method of use of a hydraulic motor drive sensor adapter.

Referring now to FIGS. 8 and 11, positional information from a moving body, e.g. joint 50 (FIG. 5) may be detected by connecting hydraulic motor drive sensor adapter 300 to a first moving component (e.g., 50b in FIG. 4), where hydraulic motor drive sensor adapter 300 is as described above. Sensor 12 is mounted to a second component (e.g., 50a in FIG. 4) disposed within a magnetic field generated by magnet 54. Main shaft 320 is rotated eccentrically about the central longitudinal axis and is used to rotate drive shaft 330. As seen herein, the second component may be viewed as remaining static with respect to a set of two or more planes which define its position in space and the first component may be movable with respect to the second component in that set of planes.

In turn, draft shaft 330 is used to rotate socket housing 312 about a constant predetermined axis, e.g. central longitudinal axis 313. The rotation of magnet 54, held within in internal chamber 352 above upper region 332 of drive shaft 330, generates a magnetic field and sensor 12 is used to sense changes in the magnetic field and produce a signal representative of the triggering event, e.g. a change in the electromagnetic field flux. This signal may be translated into a digital representation and communicated via communications network 200 (FIG. 5) to controller 110 (FIG. 5) which may then interpret the digital representation to resolve angular movement of joint 50 (FIG. 5) in or about which hydraulic motor drive sensor adapter 300 is disposed.

Figure 12:
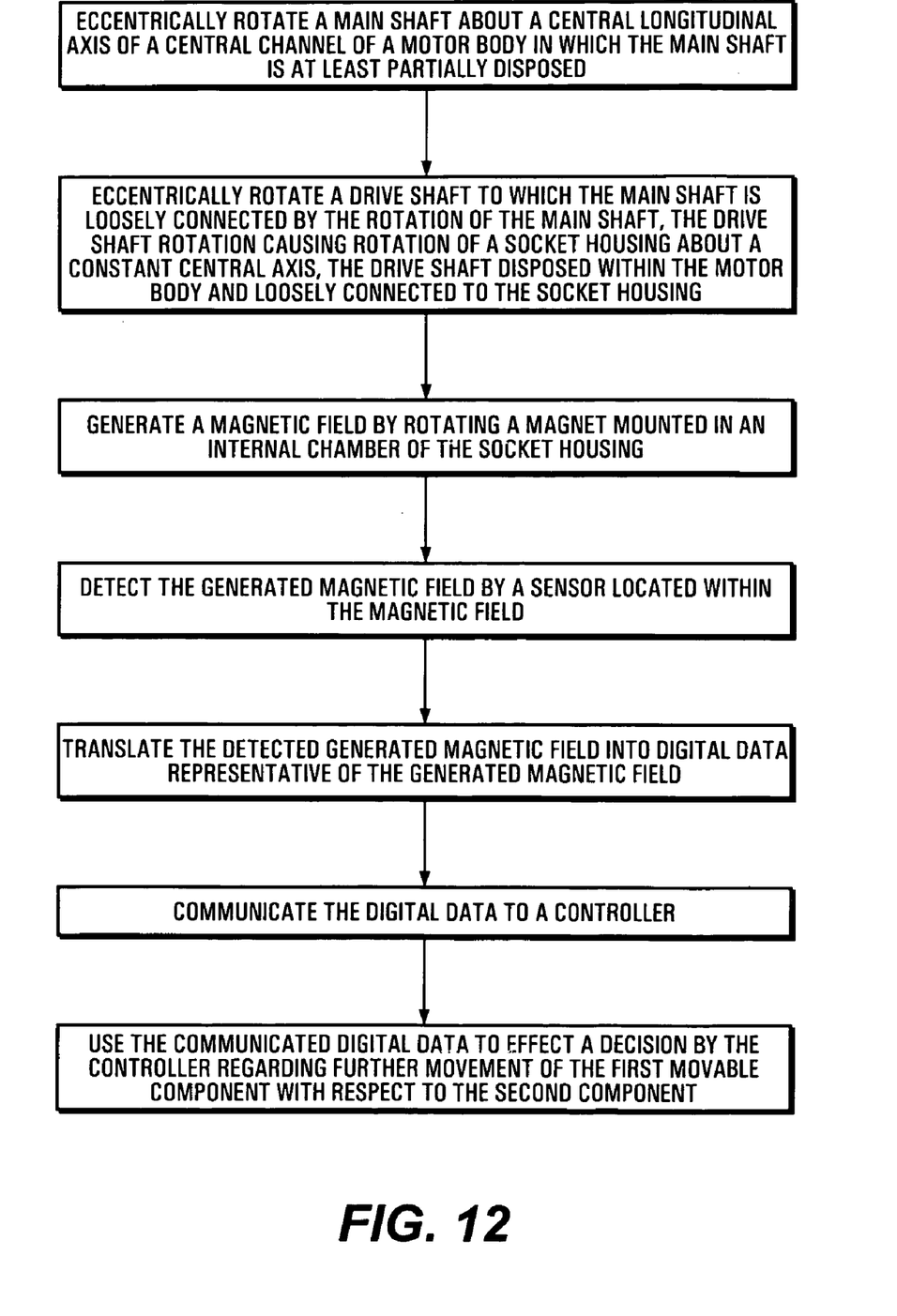
FIG. 12 is a flowchart of a second exemplary method of use of a hydraulic motor drive sensor adapter.

In a further embodiment, referring now to FIGS. 8 and 12, angular movement of a first moving component (e.g., 50b in FIG. 4) with respect to a second component (e.g., 50a in FIG. 4) where these components 50a, 50b are rotatably joined at joint 50 (FIG. 5) to effect motion in at least two planes, may be determined by eccentrically rotating main shaft 320 about central longitudinal axis 317 of central channel 316 of motor body 301 in which main shaft 320 is at least partially disposed and, accordingly, eccentrically rotating drive shaft 330, to which main shaft 320 is loosely connected, by the rotation of main shaft 320. The rotation of drive shaft 330 causes rotation of socket housing 312 about a constant central axis, e.g. central longitudinal axis 317, where drive shaft 330 is disposed within motor body 301 and loosely connected to socket housing 312. Rotating magnet 54 mounted in an internal chamber of socket housing 312 generates magnetic field which is detected by sensor 12 located within the generated magnetic field. The detected generated magnetic field is translated into digital data representative of the generated magnetic field, e.g. by sensor 12 or electronics 14 (FIG. 1) associated with sensor 12, which are then communicated to controller 110 (FIG. 5). The communicated digital data may then be used to effect a decision by controller 110 regarding further movement of the apparatuses to which sensor 12 and motor body 301 are connected, e.g. first movable component 50b and second component 50b.

It will be understood that various changes in the details, materials, and arrangements of the parts which have been described and illustrated above in order to explain the nature of this invention may be made by those skilled in the art without departing from the principle and scope of the invention as recited in the appended claims.

What is claimed is:

1. A hydraulic motor drive sensor adapter, comprising:
   a. a motor body, further comprising a central channel disposed at least partially through an internal portion of the motor body, the central channel defining a central longitudinal axis;
   b. a disk valve rotatably mounted within a pre-determined portion of the motor body and in fluid communication with the central channel, the disk valve further comprising:
      i. a central port substantially aligned with the central channel; and
      ii. an outer port disposed about an outer circumference of the disk valve;
   c. a main shaft rotatably mounted at least partially within the central channel, the main shaft further comprising:
      i. a central axis which is not concentric with the central longitudinal axis;
      ii. an upper end loosely disposed at least partially within the central port such that movement of the upper end within the central port is limited in a predetermined plane;
      iii. a drive shaft receptacle positioned at the upper end; and
      iv. a lower end;
   d. a socket housing rotatably positioned about a constant axis within the motor body, the socket housing further comprising:
      i. a top surface; and
      ii. an internal chamber;
   e. a drive shaft, disposed within an upper portion of the central channel, the drive shaft further comprising:
      i. a lower region loosely mounted in the shaft receptacle such that movement of the lower region of the drive shaft within the shaft receptacle is limited in a predetermined plane; and
      ii. an upper region disposed opposite the lower region and loosely mounted within the internal chamber such that movement of the upper region of the drive shaft within the internal chamber is limited in a predetermined plane; and
   f. a magnet mounted on the top surface of the socket housing above the upper region of the drive shaft.

2. The hydraulic motor drive sensor adapter of claim 1, further comprising a slot added along the length of the socket housing.

3. The hydraulic motor drive sensor adapter of claim 1, wherein the outer port of the disk valve comprises a plurality of outer ports.

4. The hydraulic motor drive sensor adapter of claim 1, wherein the inner diameter of the central port is smaller than the inner diameter of the central channel.

5. The hydraulic motor drive sensor adapter of claim 1, wherein the center of the central port is not concentrically aligned about the central longitudinal axis.

6. The hydraulic motor drive sensor adapter of claim 1, wherein the drive shaft is selected from the group of drive shafts consisting of a circular drive shaft, an elliptical drive shaft, an obround drive shaft, a splined drive shaft, and a polygonal drive shaft.

7. The hydraulic motor drive sensor adapter of claim 6, wherein the polygonal drive shaft comprises at least three sides.

8. The hydraulic motor drive sensor adapter of claim 1, wherein the socket housing is selected from the group of materials consisting of the same material as the main shaft and a softer bearing material.

9. The hydraulic motor drive sensor adapter of claim 1, wherein the magnet is removably fixed into place.

10. The hydraulic motor drive sensor adapter of claim 1, further comprising a sensor disposed within a magnetic field generated by the magnet.

11. The hydraulic motor drive sensor adapter of claim 10, wherein the distance separating the sensor and the magnet remains constant in a predetermined plane.

12. The angular movement detector of claim 10, wherein the sensor comprises at least one of (i) an anisotropic magneto-restrictive sensor or (ii) a Hall-effect sensor.

13. The hydraulic motor drive sensor adapter of claim 10, wherein the sensor comprises a two-axis Hall-effect sensor adapted to sense rotation of the magnet.

14. A method of detecting positional information from a moving body, comprising:
   a. connecting a hydraulic motor drive sensor adapter to a first moving component, the hydraulic motor drive sensor adapter comprising:
      i. a motor body, further comprising a central channel disposed at least partially through an internal portion of the motor body and defining a central longitudinal axis;
      ii. a disk valve rotatably mounted within a pre-determined portion of the central region, the disk valve further comprising:
         1. a central port substantially aligned with the central channel; and
         2. an outer port disposed about an outer circumference of the disk valve;
      iii. a main shaft rotatably mounted at least partially within the central channel such that a central axis of the main shaft is not concentric with the central longitudinal axis, the main shaft further comprising:
         1. an upper end loosely disposed at least partially with the central port such that movement of the upper end within the central port is limited in a predetermined plane;
         2. a drive shaft receptacle positioned at the upper end; and
         3. a lower end;
      iv. a socket housing rotatably positioned about a constant axis within the motor body, the socket housing further comprising:
         1. a top surface; and
         2. an internal chamber;
      v. a drive shaft, disposed within an upper portion of the central channel, the drive shaft further comprising:
         1. a lower region loosely mounted in the shaft receptacle such that movement of the lower region of the drive shaft within the shaft receptacle is limited in a predetermined plane; and
         2. an upper region disposed opposite the lower region and loosely mounted within the internal chamber such that movement of the upper region of the drive shaft within the internal chamber is limited in a predetermined plane; and
      vi. a magnet mounted on the top surface in the internal chamber above the upper region of the drive shaft;
   b. mounting a sensor to a second component disposed proximate the motor body within a magnetic field generated by the magnet;
   c. rotating the main shaft eccentrically about the longitudinal axis;
   d. using the rotating main shaft to rotate the drive shaft;
   e. using the draft shaft to rotate the socket housing about a constant predetermined axis;

f. generating a magnetic field by the rotation of the magnet mounted in the internal chamber above the upper region of the drive shaft; and g. sensing, with the sensor, of changes in the magnetic field.

15. A method for determining angular movement of a first movable component with respect to a second component, the components rotatably joined at a joint to effect motion in at least two planes, comprising:

a. eccentrically rotating a main shaft about a central longitudinal axis of a central channel of a motor body in which the main shaft is at least partially disposed;

b. eccentrically rotating a drive shaft to which the main shaft is loosely connected by the rotation of the main shaft, the drive shaft rotation causing rotation of a socket housing about a constant central axis, the drive shaft disposed within the motor body and loosely connected to the socket housing;

c. generating a magnetic field by rotating a magnet mounted in an internal chamber of the socket housing;

d. detecting the generated magnetic field by a sensor located within the magnetic field;

e. translating the detected generated magnetic field into digital data representative of the generated magnetic field;

f. communicating the digital data to a controller; and g. using the communicated digital data to effect a decision by the controller regarding further movement of the first movable component with respect to the second component.

* * * * *